Oct. 12, 1926.           1,603,200
R. FISHER
WINDSHIELD
Filed March 19, 1926      2 Sheets-Sheet 1

Robert Fisher
INVENTOR
BY Victor J. Evans
ATTORNEY

WITNESS

Oct. 12, 1926.
R. FISHER
WINDSHIELD
Filed March 19, 1926   2 Sheets-Sheet 2
1,603,200
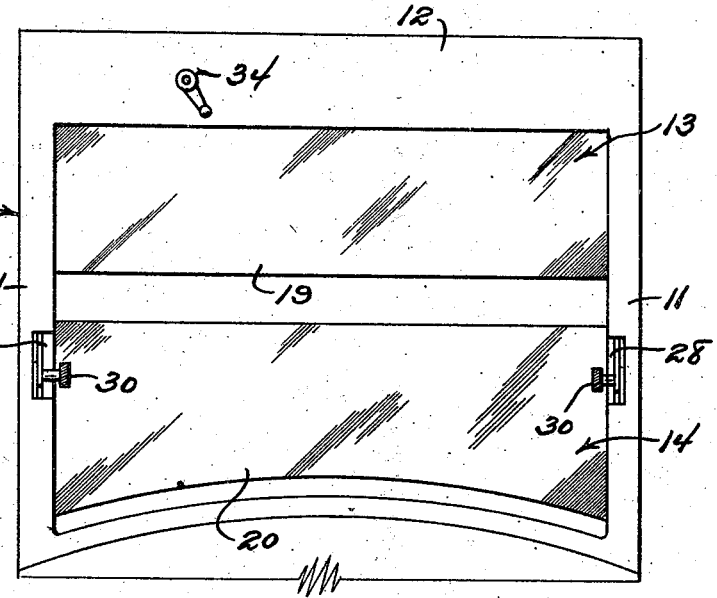
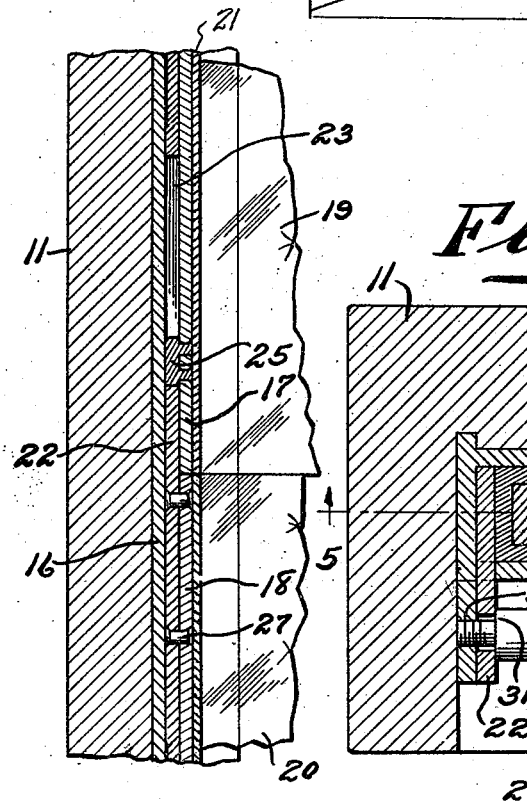
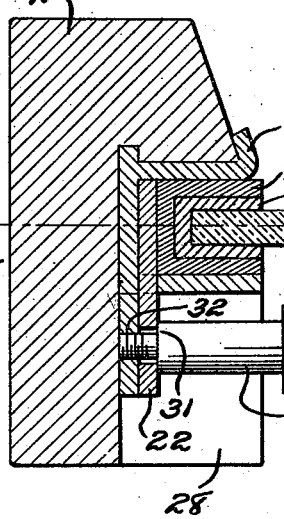
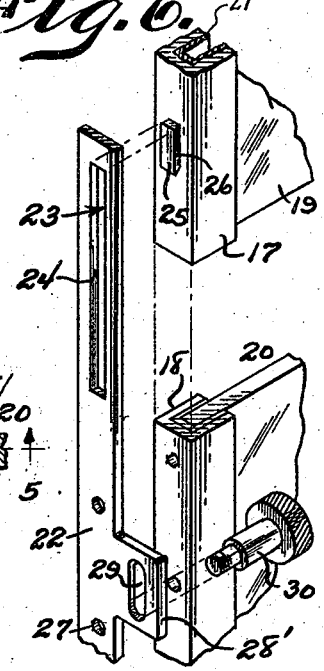
Robert Fisher
INVENTOR
BY Victor J. Evans
ATTORNEY
WITNESS: John Donovan Patented Oct. 12, 1926.

1,603,200

UNITED STATES PATENT OFFICE.

ROBERT FISHER, OF NEW YORK, N. Y.

WINDSHIELD.

Application filed March 19, 1926. Serial No. 95,960.

This invention relates to improvements in windshields and has particular reference to vehicle windshields.

The principal object of the invention resides in a windshield which includes a pair of slidable transparent panels which may be adjusted to allow air to enter the vehicle for ventilating purposes and which panels may be adjusted to exclude all elements from entering the vehicle when so desired.

Another object is to provide a windshield of the sliding type so as to be easily raised or lowered by an occupant in the front seat of an automobile, and which affords a clear vision therethrough for the operator when the shield is in any of its adjusted positions.

A further object of the invention resides in the provision of a slidably adjustable windshield which is simple in construction, easy to install in automobiles of the closed type and which does not detract from the attractive appearance of the vehicle.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 3 is a view similar to Figure 2 but showing the shield in another of its adjusted positions.

Figure 4 is an enlarged horizontal sectional view on the line 2—2 of Figure 1.

Figure 5 is a vertical sectional view on the line 5—5 of Figure 4.

Figure 6 is a perspective view of the actuating parts.

Figure 1:
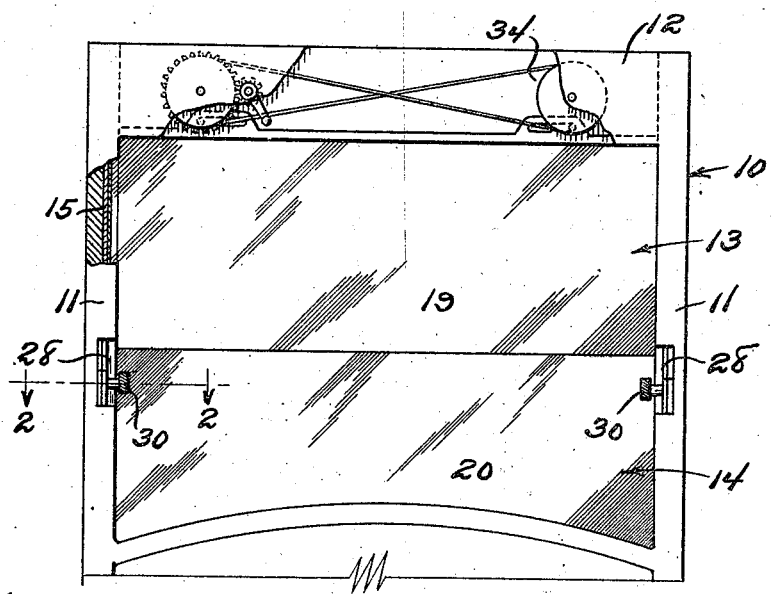
Figure 1 is a front elevational view of my improved windshield with parts broken away in section and showing the shield in a closed position.

Referring more particularly to the drawings, the reference numeral 10 designates the windshield frame of an automobile of the closed type and which includes spaced side posts 11 and a top cross piece 12 which is hollow so as to receive the top of the sliding windshield section 13 when the same is moved to a raised position. A lower windshield section 14 co-acts with the section 13 to provide a shield for closing the space within the frame and which shield sections may be adjusted with respect to each other to provide openings for the passage of air into the interior of the automobile for ventilating purposes.

The inner faces of the side posts 10 are grooved or morticed their entire length as at 15 so as to receive rubber weather strips 16 which are U-shaped in cross section for slidably receiving U-shaped channel members 17 and 18 of the respective upper and lower shield sections 13 and 14. Glass panels or panes 19 and 20 are respectively mounted in the opposed channels 17 and 18 but are held from engagement with the inner walls of the channels by cushion strips 21 which are also U-shaped in cross section and which are of lengths equal to the lengths of the channel members 17 and 18. The glass panels are frictionally held within the channel members for sliding movement therewith.

Interposed between the side walls of the channel members and the adjacent walls of the weather strips, are plates 22 of a length approximating the length of the combined channel members and each plate being provided with a slot 23, the vertical walls of which are bevelled as at 24. A lug 25 is carried by each channel member 17 and which lug has a bevelled side 26 for sliding movement with respect to the walls 24. The lug 25 extends through the slot on the face of the same and lies flush with the outer face of the plate 22. The plates 22 are riveted or otherwise secured to the respective channel members 18 as at 27 so as to be movable therewith. A bracket 28 extends from each plate 22 and passes through a slot in the weather strip 16 and into a recess 28 provided in the side posts 11. The slot and recess are of such length as to allow the plate a limited vertical movement for a purpose to be presently explained. The bracket 28 is provided with a vertical slot 29 for the free passage of a set screw 30 having a shoulder 31 on the shank thereof. The threaded shank of the set screw enters the threaded opening 32 in a plate 33 which is secured to the side wall of each of the recesses 28, while the shoulder 31 engages against the bracket when the set screw has been screwed into a clamping position for holding the lower shield in a raised position when the meeting edges of the two shield sections are in engagement.

Figure 2:
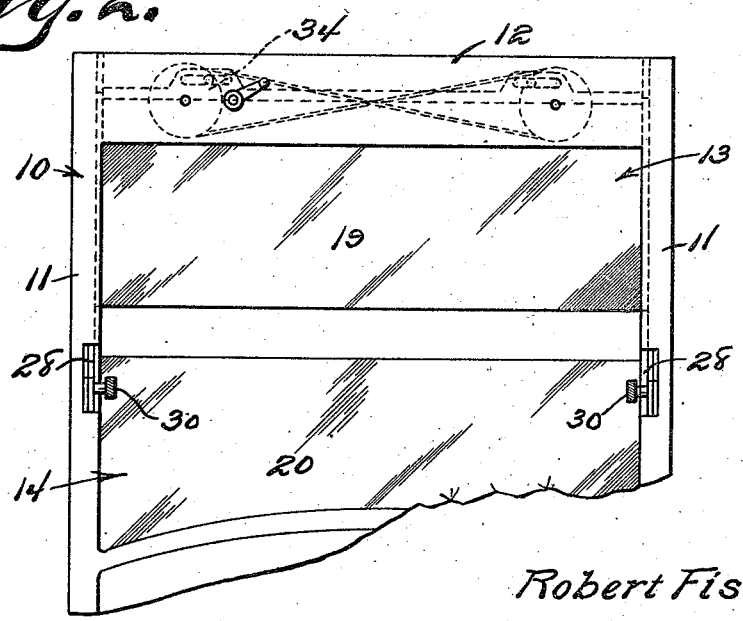
Figure 2 is a similar view but showing the position of the parts when in one of its opened adjusted positions.

In Figure 1 of the drawings, I have shown two shield sections in a normally closed position, at which time air and dust is excluded. When in this position, the top shield section 13 is resting upon the lower shield section 14 with the shank of the set screws 30 disposed at the top ends of the slots 29. Should it be desired to allow air to enter the vehicle at a point between the upper and lower shield sections, and at the bottom of the windshield, I employ a suitable lifting and lowering mechanism 34 arranged at the top of the shield frame 10 and which may be of the usual well-known construction and is adapted to actuate the upper shield section 13. When the mechanism 34 is operated to lift the shield section 13, the same moves upward away from the lower shield section 13, and continues to move away until the lugs 25 engage the top ends of the slots 24 of the respective plates 22 at which time the lower section will move with the upper section for a distance equal to the length of the slots 29. The set screws may now be tightened to clamp the lower section in a raised position and relieve the weight of the same from the lugs 25. At this time, the shield sections are in the position shown in Figure 2 of the drawing.

Should it be desired to only allow air to enter the bottom of the windshield, the mechanism 34 is reversely operated which causes the upper section 13 to move downward until it rests on the top shield section 14, thus closing the space between the two shield sections to leave only the space at the bottom of the shield as shown in Figure 3 of the drawing.

In order to close the space at the bottom, the set screws 30 are loosened which permits the lower section to drop to a closed position under its own weight, after which the mechanism 34 is further operated to lower the top section until the space between the two sections is fully closed.

From the foregoing description, it will be seen that I have constructed a windshield which includes a pair of slidable sections capable of being adjusted to various positions to admit air into a vehicle and which may be adjusted by an occupant of the front seat without undue effort. When fully closed, the windshield imparts the appearance of a single transparent panel, as there are no obstructions which might interfere with the vision of an operator.

What is claimed as new is:—

1. In combination with the windshield frame of an automobile, upper and lower transparent shield sections slidably mounted within said frame and normally closing the same, means for raising the upper shield section to provide an open space between said upper and lower shield sections, and automatic means operable when the upper shield section reaches a predetermined point in its upward movement for lifting said lower shield section a predetermined distance to provide an open space at the bottom of said windshield frame.

2. In combination with the windshield frame of an automobile, upper and lower transparent shield sections slidably mounted within said frame and normally closing the same, means for raising the upper shield section to provide an open space between said upper and lower shield sections, and automatic means operable when the upper shield section reaches a predetermined point in its upward movement for lifting said lower shield section a predetermined distance to provide an open space at the bottom of said windshield frame, and means for retaining said lower shield section in a raised position upon the lowering of said upper windshield section to close the space between said upper and lower windshield sections.

3. In combination with the windshield frame of an automobile, upper and lower transparent shield sections slidably mounted within said frame and normally closing the same, means for raising the upper shield section to provide an open space between said upper and lower shield sections, and automatic means operable when the upper shield section reaches a predetermined point in its upward movement for lifting said lower shield section a predetermined distance to provide an open space at the bottom of said windshield frame, and means for retaining said lower shield section in a raised position upon the lowering of said upper windshield section to close the space between said upper and lower windshield sections, said means including set screws carried by opposite sides of said windshield frame for clamping engagement with brackets carried by said lower shield section.

4. In combination with the side posts of the windshield frame of a vehicle having grooves provided in the inner faces and extending the length thereof, upper and lower shield sections slidably mounted within said grooves, each shield section including opposed channel members, a transparent panel supported by said channel members, plates secured to the channel members of the lower shield section and extending parallel to the channel members of the upper shield section and of lengths approximating the combined length of the upper and lower channel members, each of said plates having an elongated slot therein, a lug extending from each of the upper channel members into the respective slot, substantially as and for the purpose specified.

5. In combination with the side posts of the windshield frame of a vehicle having grooves provided in the inner faces and extending the length thereof, upper and lower shield sections slidably mounted within said grooves, each shield section including opposed channel members, a transparent panel yieldably supported by said channel members, yieldable weather strips seated within said grooves and extending the length of the same, plates secured to the channel members of the lower shield section and extending parallel to the channel members of the upper shield section and of lengths approximating the combined length of the upper and lower channel members, each of said plates having an elongated slot therein, a lug extending from each of the upper channel members into the respective slot, substantially as and for the purpose specified.

6. A windshield comprising a frame structure, upper and lower transparent shield sections slidably mounted within said frame structure and normally disposed in meeting engagement with each other to completely close said frame structure, actuating means for raising said upper shield section with respect to said lower shield section, and automatic means operable when the upper shield section reaches a predetermined point in its upward movement for lifting said lower shield section a predetermined distance, said automatic means including plates carried by the opposed sides of said lower shield section and extending parallel to the sides of said upper shield section, said plate having elongated slots therein for the reception of lugs carried by the sides of said upper shield section, whereby said lugs engage the upper closed ends of said slots after the upper section has been raised the above specified distance.

7. A windshield comprising a frame structure, upper and lower transparent shield sections slidably mounted within said frame structure and normally disposed in meeting engagement with each other to completely close said frame structure, actuating means for raising said upper shield section with respect to said lower shield section, automatic means operable when the upper shield section reaches a predetermined point in its upward movement for lifting said lower shield section a predetermined distance, said automatic means including plates carried by the opposed sides of said lower shield section and extending parallel to the sides of said upper shield section, said plate having elongated slots therein for the reception of lugs carried by the sides of said upper shield section, whereby said lugs engage the upper closed ends of said slots after the upper section has been raised the above specified distance, and means for locking said lower shield section in a raised position upon the lowering of said upper shield section into meeting engagement with said lower shield section.

In testimony whereof I have affixed my signature.

ROBERT FISHER.